United States Patent
Ferlitsch

(10) Patent No.: US 8,289,536 B2
(45) Date of Patent: Oct. 16, 2012

(54) SYSTEMS AND METHODS FOR DETAILED JOB ACCOUNTING FOR THIN CLIENT RENDERING

(75) Inventor: Andrew R. Ferlitsch, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1537 days.

(21) Appl. No.: 11/537,356

(22) Filed: Sep. 29, 2006

(65) Prior Publication Data

US 2008/0079986 A1    Apr. 3, 2008

(51) Int. Cl.
G06F 3/12  (2006.01)
G06K 15/00 (2006.01)

(52) U.S. Cl. .................. 358/1.15; 358/1.13; 358/1.18

(58) Field of Classification Search .................. 358/1.15
See application file for complete search history.

(56) References Cited

U.S. PATENT DOCUMENTS

| | | | |
|---|---|---|---|
| 6,064,838 A | 5/2000 | Maruta et al. | |
| 6,119,934 A | 9/2000 | Kolls | |
| 6,348,971 B2* | 2/2002 | Owa et al. | 358/1.15 |
| 6,356,359 B1 | 3/2002 | Motamed | |
| 2002/0035941 A1* | 3/2002 | Nakao | 101/484 |
| 2002/0078275 A1 | 6/2002 | Yamaguchi | |
| 2002/0175208 A1 | 11/2002 | Bartley et al. | |
| 2003/0090705 A1 | 5/2003 | Ferlitsch | |
| 2003/0133147 A1 | 7/2003 | Peeters | |
| 2005/0071739 A1 | 3/2005 | Gava | |
| 2005/0108032 A1 | 5/2005 | Josephsen et al. | |

FOREIGN PATENT DOCUMENTS

| | | |
|---|---|---|
| EP | 0486160 | 5/1992 |
| EP | 1521195 | 4/2005 |
| JP | 08292844 | 11/1996 |
| JP | 2000284928 | 10/2000 |
| JP | 2001-312386 | 11/2001 |
| JP | 2003-196072 | 7/2003 |
| JP | 2003241953 | 8/2003 |
| JP | 2003-271349 | 9/2003 |
| JP | 2004-303236 | 10/2004 |
| WO | 9618980 | 6/1996 |
| WO | 0110113 | 2/2001 |

OTHER PUBLICATIONS

"PrintLog Accounting Server, Version 2.5.4, Getting Started Guide," http://download.metrics.com/product/pas/63636/PAS254-GettingStarted.pdf, pp. 1-186.

* cited by examiner

*Primary Examiner* — Dov Popovici

(74) *Attorney, Agent, or Firm* — Austin Rapp & Hardman

(57) ABSTRACT

In an exemplary embodiment, a job request is received. The job request may include at least one accounting detail requirement. A determination may be made about whether the at least one accounting detail requirement is supported by a rendering device. If the at least one accounting detail requirement is supported by the rendering device, the method may involve facilitating determination by the rendering device of at least one accounting detail corresponding to the at least one accounting detail requirement. If the at least one accounting detail requirement is not supported by the rendering device, the at least one accounting detail corresponding to the at least one accounting detail requirement may be determined by performing a job simulation.

14 Claims, 16 Drawing Sheets

SYSTEMS AND METHODS FOR DETAILED JOB ACCOUNTING FOR THIN CLIENT RENDERING

RELATED APPLICATIONS

This application is related to U.S. patent application Ser. No. 11/536,572 filed Sep. 28, 2006, for "Systems And Methods For Facilitating Direct Scanning To Network Destinations By Clients," with inventor Andrew R. Ferlitsch, which is incorporated herein by reference.

TECHNICAL FIELD

The present invention relates generally to computers and computer-related technology. More specifically, the present invention relates to systems and methods for detailed job accounting for thin client rendering.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Printers are a type of imaging device. Imaging devices include, but are not limited to, physical printers, multi-functional peripherals (MFPs), a printer pool, a printer cluster, a fax machine, a plotter, a scanner, a logical device, an electronic whiteboard, a tablet PC, a computer monitor, a file, etc. The term "imaging," as used herein, should be interpreted broadly to include any process for producing a copy of a document onto paper, a computer screen, an electronic image, or the like.

Different kinds of computer software facilitate the use of imaging devices. The computer or computing device that will be used to image (e.g., print) the materials typically has one or more pieces of software running on the computer that enable it to send the necessary information to the imaging device to enable the materials to be imaged. If the computer or computing device is on a computer network there may be one or more pieces of software running on one or more computers on the computer network that facilitate imaging.

Documents which are sent to an imaging device for imaging are sometimes referred to as imaging jobs (e.g., print jobs). In certain computing environments, it may be desirable to track information that relates to each imaging job. The information that is tracked may be used for a variety of reasons. Tracking information relating to each imaging job may be referred to herein as imaging job accounting. Benefits may be realized by providing increased functionality to the software used in imaging and imaging job accounting.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
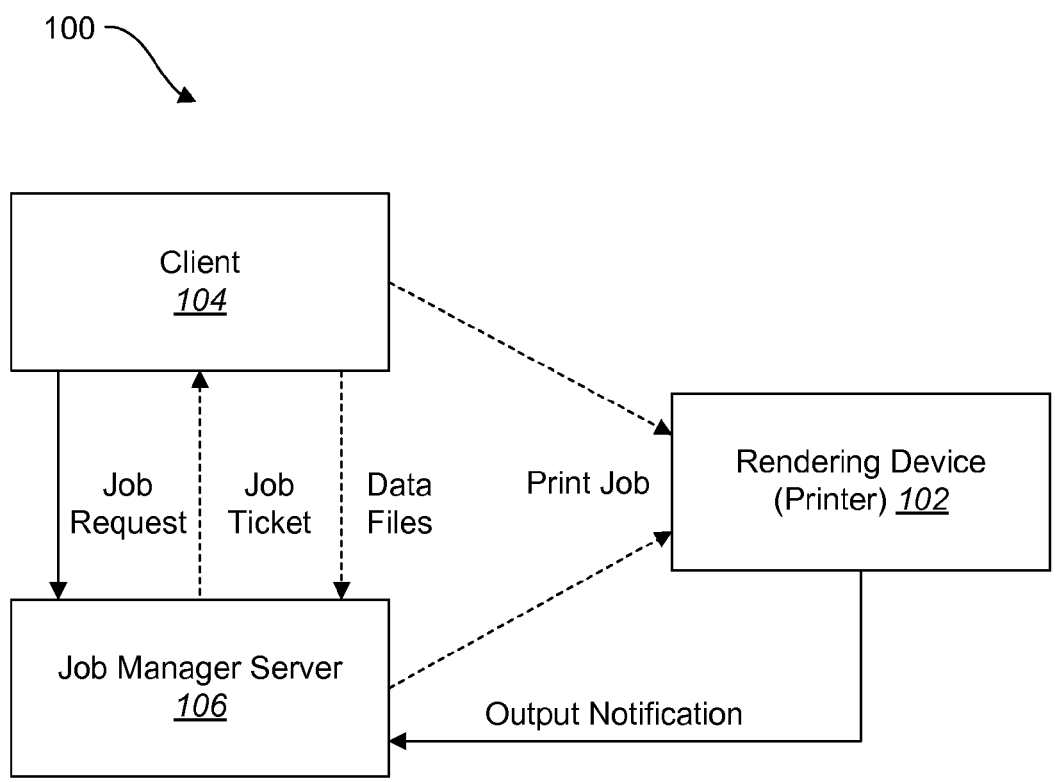
FIG. 1 illustrates an exemplary operating environment in which embodiments may be practiced.

A method for detailed job accounting for thin client rendering is disclosed. The method may be implemented by a rendering server. In accordance with an embodiment, the rendering server may receive a job request. The job request may include at least one accounting detail requirement. The rendering server may determine whether the at least one accounting detail requirement is supported by a rendering device. If the at least one accounting detail requirement is supported by the rendering device, the rendering server may facilitate determination by the rendering device of at least one accounting detail corresponding to the at least one accounting detail requirement. If the at least one accounting detail requirement is not supported by the rendering device, the rendering server may determine the at least one accounting detail corresponding to the at least one accounting detail requirement by performing a job simulation. The job simulation may be performed using a low parse method which involves less processing than a full parse method that is performed by the rendering device.

The job request may be an imaging job request from a client for sending an imaging job to the rendering device. The rendering server may determine that the rendering device is configured to satisfy all requirements of the imaging job request. If this occurs, the rendering server may instruct the client to directly despool a job ticket and file data for the imaging job to the rendering device.

The rendering server may determine that the rendering device does not support the at least one accounting requirement of the imaging job request. If this occurs, the rendering server may instruct the client to send file data for the imaging job to the rendering server. The rendering server may provide the file data to a job simulator. The rendering server may send the file data to the rendering device when the at least one accounting detail has been determined.

The rendering server may determine that at least one file format requirement of the imaging job request is not supported by the rendering device. If this occurs, the rendering server may instruct the client to send file data for the imaging job to the rendering server. The rendering server may translate the file data into a format that is supported by the rendering device, and send the translated file data to the rendering device.

The rendering server may determine that at least one job requirement of the imaging job request is not supported by the rendering device. The rendering server may instruct the client to send file data for the imaging job to the rendering server. The rendering server may emulate the at least one job requirement of the imaging job request on the rendering device.

The job request may be a destination profile job request for loading a destination profile on the rendering device. The rendering server may determine that the rendering device is configured to satisfy all requirements of the destination profile job request. If this occurs, the rendering server may construct a destination profile that specifies the requirements of the destination profile job request and send the destination profile to the rendering device.

The rendering server may determine that at least one accounting detail requirement of the destination profile job request is not supported by the rendering device, and that at least one other requirement of the destination profile job request is supported by the rendering device. If this occurs, the rendering server may construct a native destination profile that specifies the at least one other requirement of the destination profile job request that is supported by the rendering device and that specifies the rendering server as a destination. The rendering server may send the native destination profile to the rendering device. The rendering server may construct a non-native destination profile that specifies the at least one accounting detail requirement and that specifies a final destination. The rendering server may store the non-native destination profile on the rendering server.

The rendering server may determine that at least one accounting detail requirement of the destination profile job request is supported by the rendering device, and that at least one other requirement of the destination profile job request is not supported by the rendering device. If this occurs, the rendering server may construct a native destination profile that specifies the at least one accounting detail requirement and that specifies the rendering server as a destination. The rendering server may send the native destination profile to the rendering device. The rendering server may construct a non-native destination profile that specifies the at least one other requirement that is not supported by the rendering device. The rendering server may store the non-native destination profile on the rendering server.

The rendering server may determine that at least one accounting detail requirement of the destination profile job request is not supported by the rendering device, and that at least one other requirement of the destination profile job request is not supported by the rendering device. If this occurs, the rendering server may construct a native destination profile that specifies the rendering server as a destination. The rendering server may send the native destination profile to the rendering device. The rendering server may construct a non-native destination profile that specifies the at least one accounting detail requirement and the at least one other requirement that is not supported by the rendering device. The rendering server may store the non-native destination profile on the rendering server.

The rendering server may receive image data from the rendering device. The rendering server may provide the image data to a job simulator.

The rendering server may export the at least one accounting detail to an accounting system. Alternatively, or in addition, the rendering server may maintain the at least one accounting detail on the rendering server in an internal accounting system. The rendering server may wait for a job completion notification from the rendering device before committing an accounting transaction.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment," "embodiment," "embodiments," "the embodiment," "the embodiments," "one or more embodiments," "some embodiments,"

"certain embodiments," "one embodiment," "another embodiment" and the like mean "one or more (but not necessarily all) embodiments of the disclosed invention(s)," unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

When an administrator of a multi-functional peripheral (MFP) configures an organizational (or otherwise large) scale set of MFPs for account control (e.g., click counts per user/department), the administrator may desire that all MFP operations are monitored through the account control. The administrator may also desire that the account details (e.g., paper size, duplex, etc.) are consistent across devices, regardless of the type/reporting capability of the device.

One method to count clicks for local and network printing is demonstrated by the open source lprng program. The following is a brief description of how this program determines the number of pages or sheets printed per print job. The lprng program acts as a print spooler. Prior to sending the job, the program obtains from the printer the current page count total (via the Simple Network Management Protocol, or SNMP). The spooler then sends the job. The spooler polls the printer until it is idle. Once idle, the spooler obtains the new page count total. The spooler then subtracts the old count from the new count to determine the number of pages/sheets printed.

Another method for print job accounting is demonstrated by the Printer Job Language (PJL) USTATUS JOB=ON protocol. In this method, the spooler sends a command to the printer indicating to send asynchronous job status notifications back to the spooler. The spooler then sends the job and waits for the asynchronous notification. When the spooler receives the notification, in addition to indicating the outcome of the job, the notification contains the number of sheets output.

Another method for print job accounting is demonstrated by Sharp Corporation's Notify Job Return (NJR) protocol. In this method, the print job contains additional command directives to send job completion notifications to a specified address/port, and to include sheet count and the number of inks used (color). This method simplifies the non-serial release/monitoring of the print job, provides color vs. black-and-white information, and allows detaching the account monitoring from the spooler.

Another method for print job accounting is demonstrated by the Hewlett Packard Peripheral Management Language (PML) MIB. In this method, prior to sending the job, the spooler obtains from the printer its current page count total (via SNMP) from the PML Enterprise MIB. The spooler then sends the job. The spooler polls the printer until it is idle, or waits for job completion notification. Once idle, the spooler obtains the new page count totals from the PML MIB. The spooler then subtracts the old counts from the new counts to determine the number of pages/sheets printed. The PML MIB protocol contains more detailed information on page counts than the standard RFC 1759 Printer MIB. This information includes simplex versus duplex counts, counts by paper size, and black-and-white versus color counts (by job).

Another method for print job accounting is demonstrated by the Sharp E-Mail RIC function. In this method, the device is able to periodically export (e.g., send via email), in an automated method, the total print, fax, file, copy and scan counts to an external site outside the corporate firewall. The external site can then process the click accounting data either manually or in an automated fashion.

In another method for print job accounting, a de-spooling process upstream from the port monitor pre-analyzes the print stream to determine the billable amount, such as using a print processor in the Microsoft Windows print subsystem. Examples of billable amounts include: number of sheets, paper size, simplex/duplex, color vs. black-and-white, etc. Additionally, color determination can be decided on a per page (versus job) basis. The protocol independent de-spooling component then communicates with an accounting process for authorization for the billable amount.

Other methods for print job accounting include using vendor control interfaces (VCI) on MFPs for walk-up operations. In these types of devices, the device has an external vendor control interface (VCI) that can be connected to an external device, such as a coin-op box. The VCI uses an inbound pulse to enable/disable the copier and an outbound pulse to count the number of impressions printed/outputted by the device (clicks). For example, if the coin-op charges five cents and the user inserts 25 cents, the coin-op box sends an inbound enable pulse to the device. For each printed page outputted, the device sends an outbound click pulse. For each received click pulse, the coin-op debits five cents. Once 5 pulses are received (i.e., the balance goes to zero), the coin-op box sends an inbound disable pulse. The Equitrac PAS and Sharp vendor interface kit (see Sharp Support Bulletin, DVEND External Vendor Interface Kits, February 2001) is an example of a device and external box that uses this method.

In another method, an accounting system works by intercepting the print data prior to delivery, and analyzing the print data to pre-determine the amount of billable operations/materials that will be consumed. The system can then do a debit authorization for the entire job before releasing the print job to the printing device. One example of a product using this method is Equitrac PAS. In this product, print jobs are routed through a print server instead of directly to the printer. The print server then de-spools the print job to the printer via a port monitor. In this case, Equitrac PAS uses a custom port monitor that pre-analyzes the print stream to determine the billable amount. The port monitor then communicates with an accounting process for authorization for the billable amount. If authorized, the port monitor releases the job; otherwise, the job is not released.

In the present disclosure, an effective method for administrating an MFP environment for account control is disclosed. In some embodiments, all MFP operations may be monitored through the account control. Also, the account details (e.g., paper size, duplex, etc) may be consistent across devices, regardless of the type/reporting capability of the device.

The exemplary operating environments may include one or more connected MFP devices that may perform multiple types of rendering operations (e.g., print, scan, copy, etc). A user may initiate an imaging job request to one or more of the MFPs from a thin client, via a job manager operating on a server computing device.

In an exemplary operating environment, the job manager may determine if the thin client can directly submit the job requirements and file data to the rendering device (e.g., native rendering), or if the job requirements and file data must first be sent to the server for some processing (e.g., format conversion). The job manager may receive job status notifications from the rendering device, regardless of whether the thin client or the job manager despooled (i.e., transmitted) the job to the device. The job manager may then reformat the notification into a device independent format, and send the reformatted notification to the thin client.

In some embodiments, the job manager may determine if the required level of accounting details is supported by the MFP. If the MFP supports the file format, job requirements and accounting details (i.e. native), the job manager may instruct the client/device to execute the job in the most efficient manner, without conversion of the file formats, emulation of rendering services on a host, redundant transmission of file data (e.g., from client to server and then from server to device, or vice-versa), or job simulation to determine accounting details. In this case, the thin client may submit the job ticket and file data directly to the MFP device.

Otherwise, if one or more of the above are not supported natively, the file data may be first sent from the thin client to the server. If the file format (e.g., PDF) is not native, the job manager on the server may translate the file data into a format compatible (e.g., PCL) with the MFP. If one or more job requirements (e.g., booklet) are not supported on the MFP, the job requirement may then be emulated on the server. Finally, if the level of reporting accounting details is not native to the MFP, the job manager may first perform a job simulation (e.g., low parse) on the server to pre-calculate the resources used according to the required level of accounting details (e.g., number of sheets, color versus black-and-white, etc.). The job simulation may be accomplished using a low parse method that may perform substantially less processing than a full parse/interpretation, such as what may be performed by the MFP. The purpose of the job simulation may be to determine the resources that may be used, at the specified detail level, to render the job. The job manager may then export the accounting details for the job to an accounting system, or may be maintained on the rendering server in an internal accounting system. The job manager may also use the MFP's job completion notification method to verify that the job actually fully outputted before updating (i.e., committing the billable charge) the accounting system.

FIG. 1 illustrates an exemplary operating environment 100 in which embodiments may be practiced. The exemplary operating environment 100 may include one or more rendering devices 102. The rendering devices 102 may be MFP devices, or single function rendering devices 102. The rendering devices 102 may be locally connected, connected to the same network, remotely connected, etc. As shown in FIG. 1, a rendering device 102 may be embodied as a printer 102. Other examples of rendering devices 102 that may be used include a scanner, a copier, a facsimile device, a filing device, a conversion device, a publishing device, an electronic whiteboard, a plotter, an audio/video recorder/player, a video projector, an x-ray, MRI, CAT-scan device, or the like.

A user may initiate an imaging job request to one or more of the rendering devices 102 from a thin client 104. Some examples of a thin client 104 include a terminal, a laptop, a workstation, a personal digital assistant (PDA), a cell phone, etc. The thin client 104 may lack a device driver, a format specific application, and/or a spooling/monitoring subsystem, that would otherwise be needed to render the file data on the MFP 102.

The thin client 104 may initiate an imaging job by making a request to a job manager 106. The job manager 106 may then determine if the client-side input/output file formats and job requirements are compatible with the rendering device 102. If so, the job manager 106 may send a job ticket to the thin client 104, and the thin client 104 may directly de-spool the files and the job ticket to the rendering device 102. Otherwise, the job manager 106 may retrieve the files from the thin client 104, perform some processing (e.g., format conversion, page re-ordering, etc.) on the files, and send the processed files and the job ticket to the rendering device 102. Additionally, the job manager 106 may receive job status notifications from the rendering device 102, regardless of whether the thin client 104 or the job manager 106 de-spooled the job to the rendering device 102. The job manager 106 may then reformat the notification into a device-independent format, and send the reformatted notification to the thin client 104.

Figure 2:
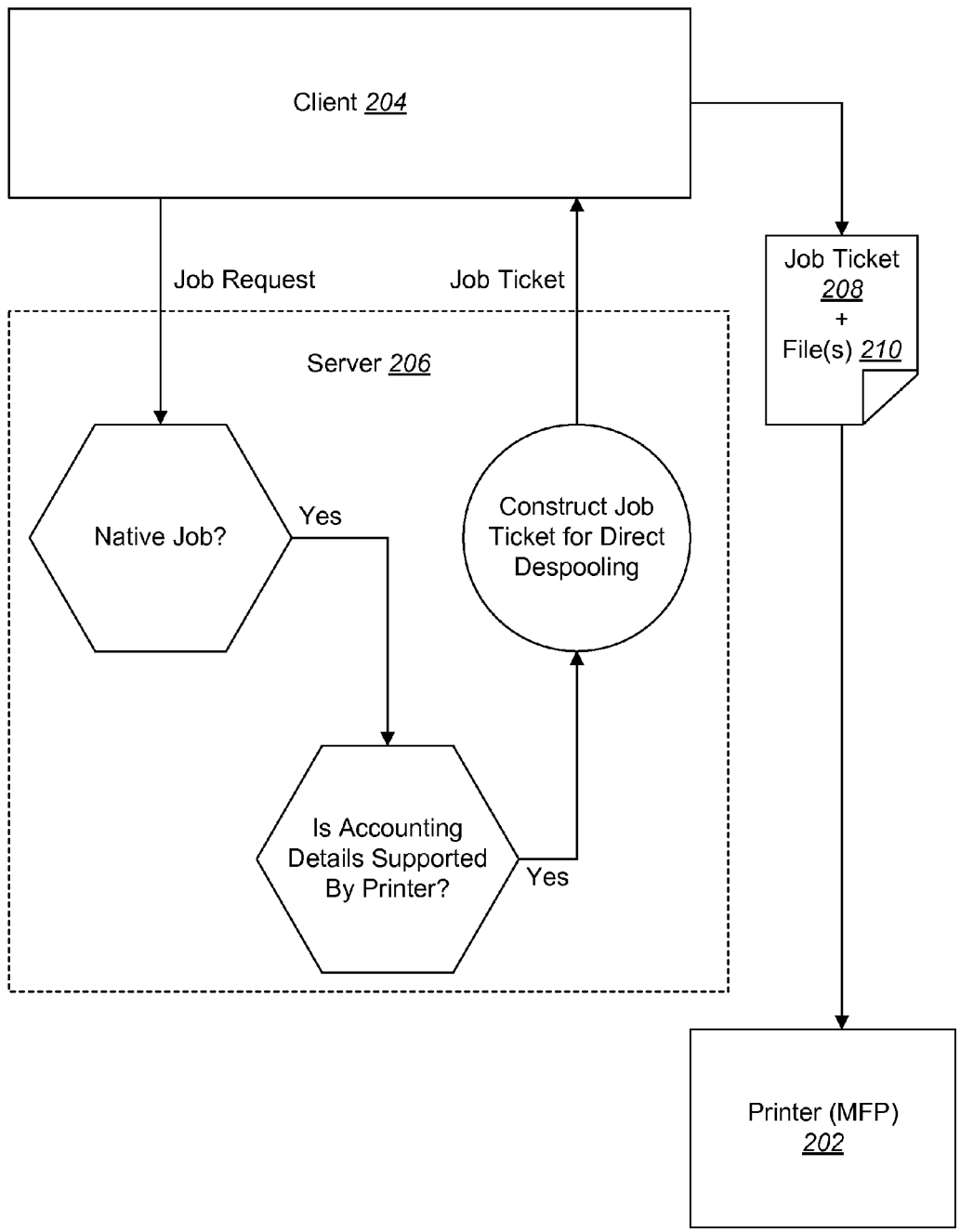
FIG. 2 illustrates a mode of an embodiment in which file format, job requirements, and accounting details may be supported by a rendering device.

Referring now to FIG. 2, a rendering device 202, a thin client 204, and a rendering server 206 may be provided in accordance with an embodiment. The rendering device 202 may be a printer 202, such as an MFP 202. The thin client 204 may desire to perform an outbound rendering operation to the MFP 202, such as a print, outbound fax or file operation. The rendering server 206 may determine, from the job request, that the file formats, job requirements and level of accounting details are native to the MFP 202. In this case, the rendering server 206 may produce the corresponding job ticket, send the job ticket to the thin client 204, and instruct the thin client 204 to directly de-spool the job ticket 208 and file data 210 to the MFP 202.

Figure 3A:
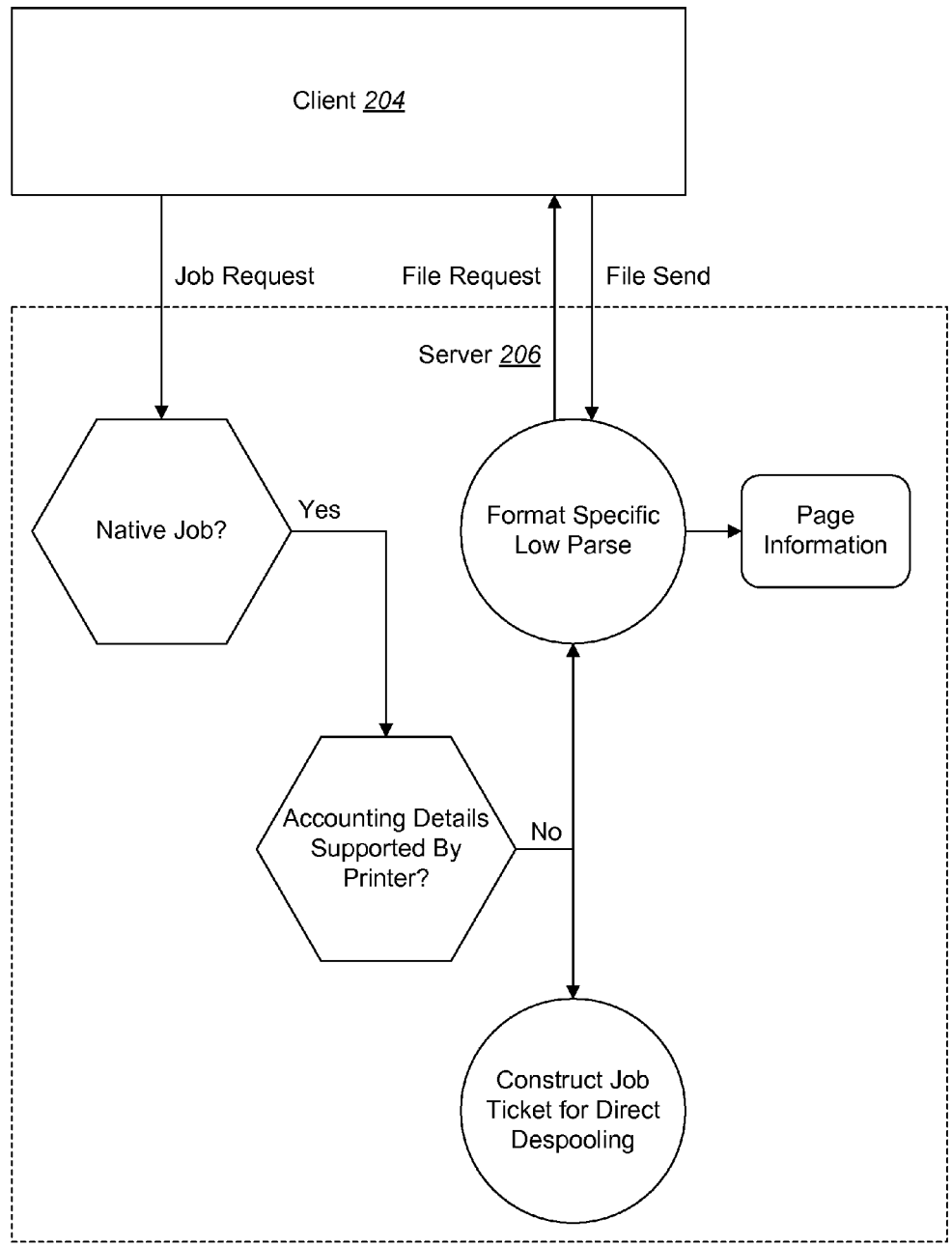
FIGS. 3A and 3B illustrate a mode of the above embodiment in which file format and job requirements may be supported by the rendering device, but accounting details may not be supported by the rendering device.
Figure 3B:
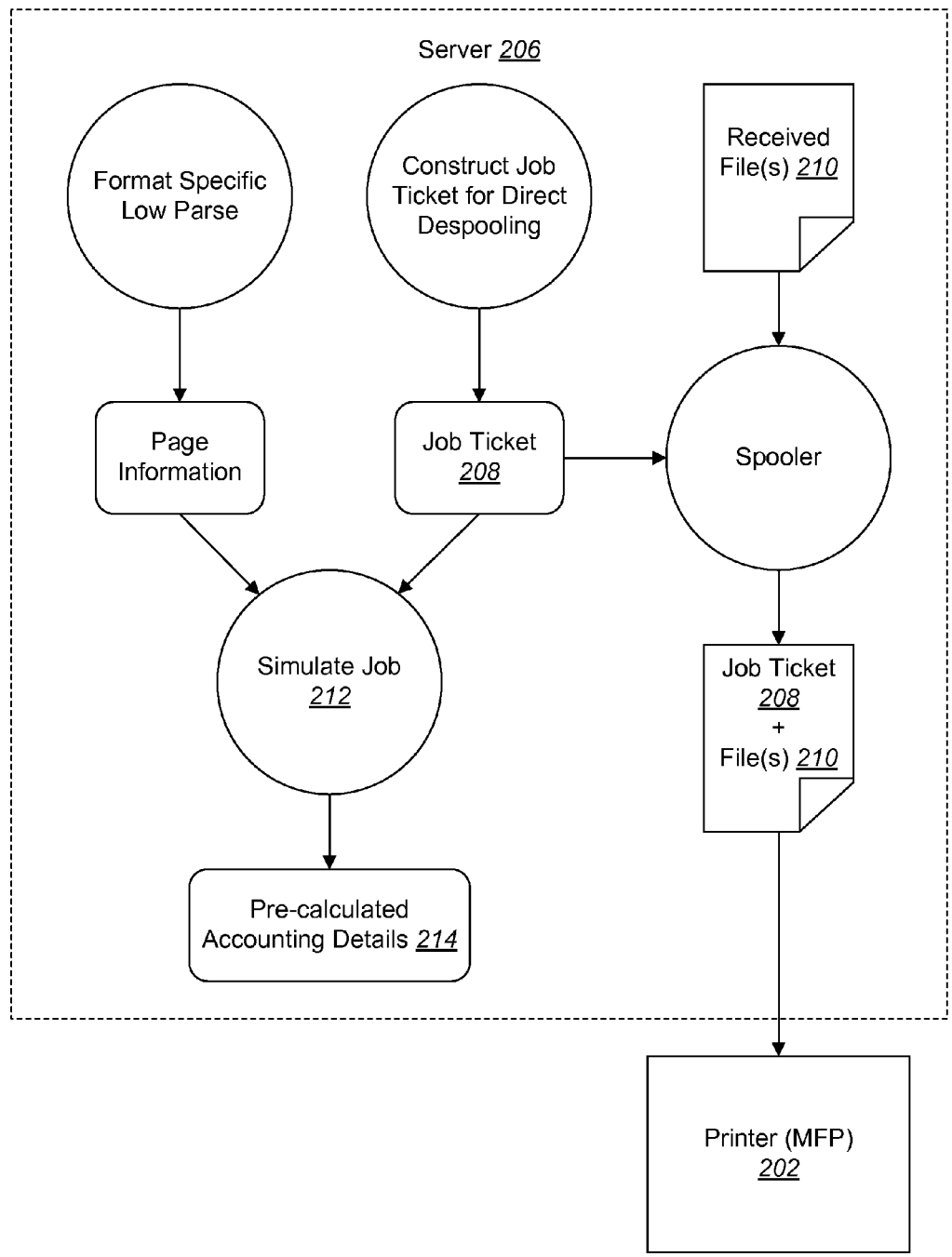

Referring now to FIGS. 3A and 3B, in another mode of the above embodiment, the rendering server 206 may determine, from a job request, that the file formats and job requirements are native to the MFP 202, but the level of accounting details are not. In this case, the rendering server 206 may produce the corresponding job ticket 208, but instruct the thin client 204 to send the file data 210 to the server 206. The file data 210 (e.g., page information) and job ticket 208 may be passed to a job simulator 212, which may determine the amount of resources that will be consumed according to the accounting details 214.

The following are examples of accounting details 214 that may be specified in a print/fax/file job: number of sheets, simplex vs. duplex, paper size, paper stock, blank sheets, color vs. black-and-white, number of sheets color, number of sheets black-and-white, amount of K toner used, amount of CMY toner used, finishing, number of copies stapled, number of sheets punched, number of images (fax), image size, number of bytes (fax, file), number of files (file), number of recipients (phone numbers, mailboxes, etc), and so forth.

The job simulator 212 may determine the accounting details 214 by any manner. The job simulator 212 may use a low parse method to efficiently parse the file data 210 for information, according to the specified accounting details 214, such as the number of pages or images, the page/image size, blank pages, color vs. black-and-white, which pages have color information, which pages do not have color information, coverage, approximate amount of toner that will be consumed, and so forth.

The job simulator 212 may then combine the basic information gathered above with the job requirements to determine the actual physical consumption. For example, the document may be 10 pages, but the job requirements may say to print 2 pages per sheet face (i.e., 2-up) in duplex mode. This would result in 3 duplex sheets printed, with the back sheet surface of the 3rd sheet blank.

Once the accounting details are calculated, the job ticket 208 and file data 210, without additional processing, may be passed to the MFP 202. The rendering server 206 may additionally wait for a job completion notification before committing the accounting transaction. The accounting transaction may be performed on the rendering server 206 or exported to an external accounting application.

Figure 4:
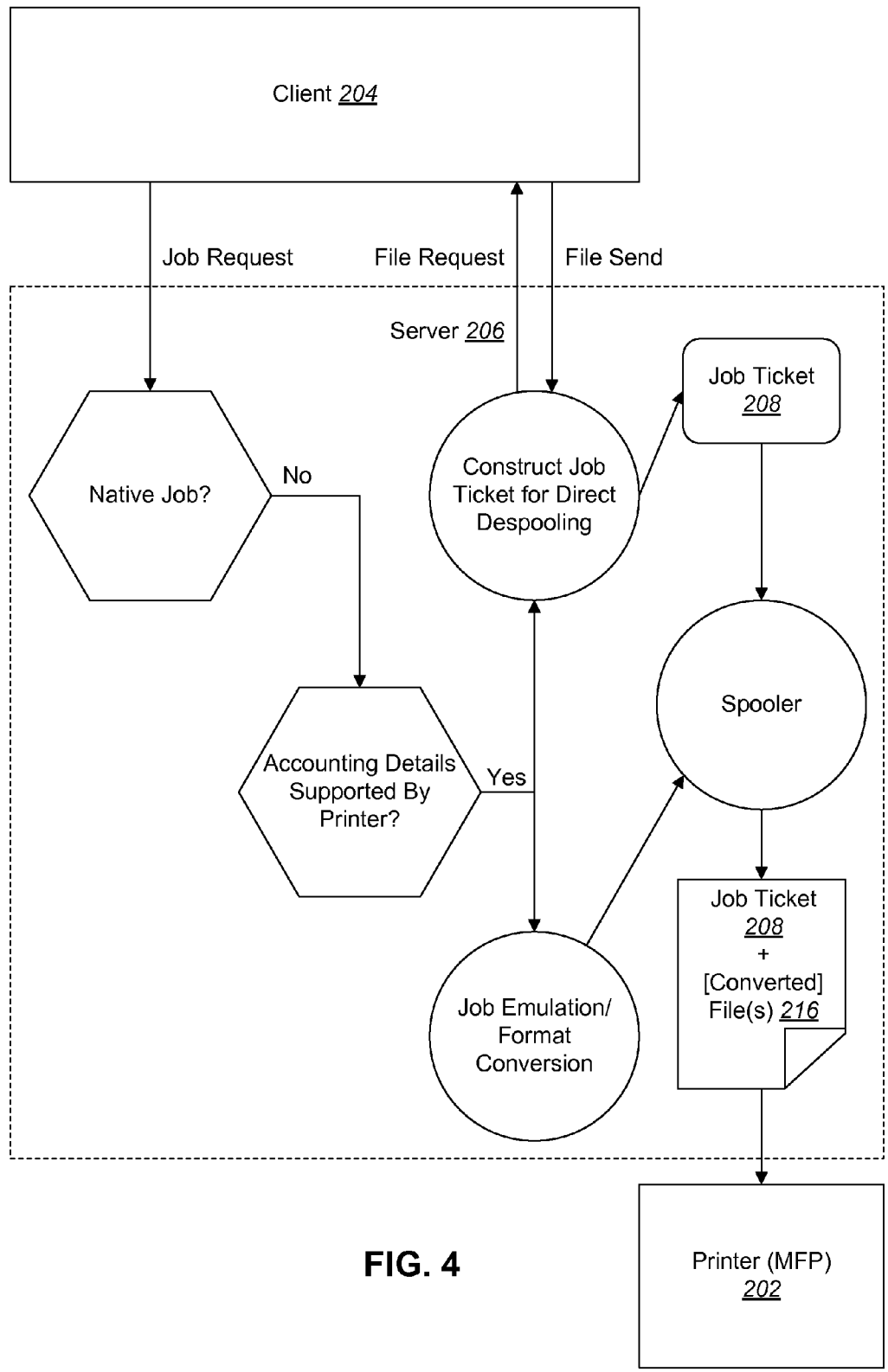
FIG. 4 illustrates a mode of the above embodiment in which file format and job requirements may not be supported by the rendering device, but accounting details may be supported by the rendering device.

Referring now to FIG. 4, in another mode of the above embodiment, the rendering server 206 may determine, from the job request, that the accounting details are native to the MFP 202, but either or both the file formats and job requirements are non-native to the MFP 202. In this case, the rendering server 206 may produce the corresponding job ticket 208, but instruct the thin client 204 to send the file data to the server 206. The rendering server 206 may then perform any format translation (e.g., PDF to PCL) or host emulation. Some examples of host emulation may include sheet assembly (e.g., reverse order, N-up, booklet, blank page removal, etc.), streaming conversion, under color removal (UCR, K-substitution), black-and-white only, re-encoding (e.g., compression, encryption/decryption, etc.), document indicia (e.g., watermarks, Bates stamping, page numbering, headers/footers, etc.), and so forth. The server preprocessed file data 216 and job ticket 208 may then be sent directly to the MFP 202, where the accounting details are then handled natively by the MFP 202.

Figure 5A:
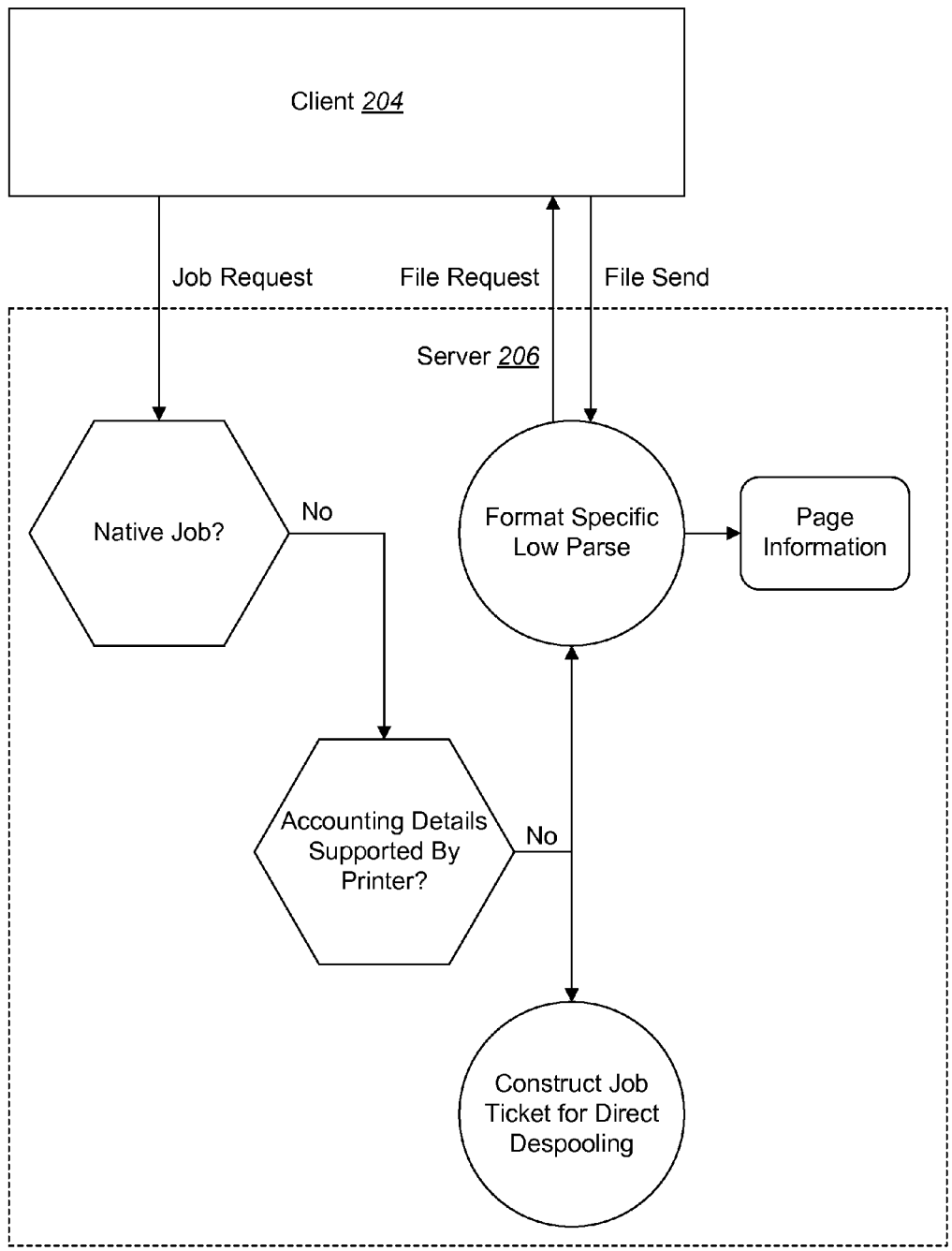
FIGS. 5A and 5B illustrate a mode of the above embodiment in which file format or job requirements may not be supported by the rendering device, and accounting details may not be supported by the rendering device.
Figure 5B:
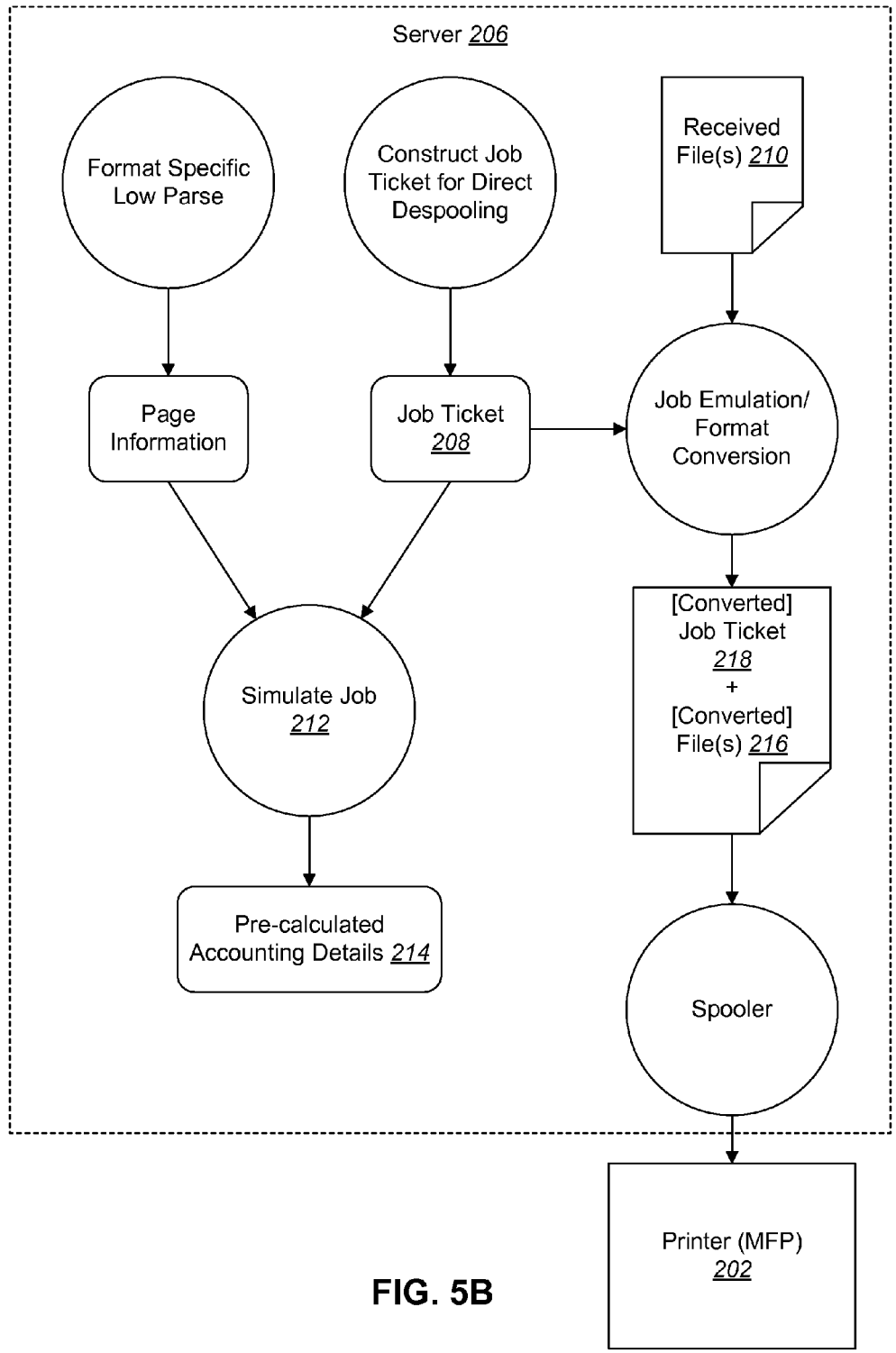

Referring now to FIGS. 5A and 5B, in another mode of the above embodiment, the rendering server 206 may determine, from the job request, that the file formats, job requirements and accounting details are all non-native to the MFP 202. In this case, the rendering server 206 may produce the corresponding job ticket 208, but instruct the thin client 204 to send the file data 210 to the server 206. The file data 210 and job ticket 208 may then be passed to a job simulator 212, which may determine the amount of resources that will be consumed according to the accounting details 214. The rendering server 206 may then perform any format translation (e.g., PDF to PCL) or host emulation. In another mode of this embodiment, the file data may first undergo format translation, and the job simulation is then performed on the formatted translated version of the file data.

Once the accounting details 214 are calculated, the job ticket 208 and server processed file data 216 may be passed to the MFP 202. The rendering server 206 may additionally wait for a job completion notification before committing the accounting transaction. The accounting transaction may be performed on the rendering server 206 or exported to an external accounting application.

Figure 6:
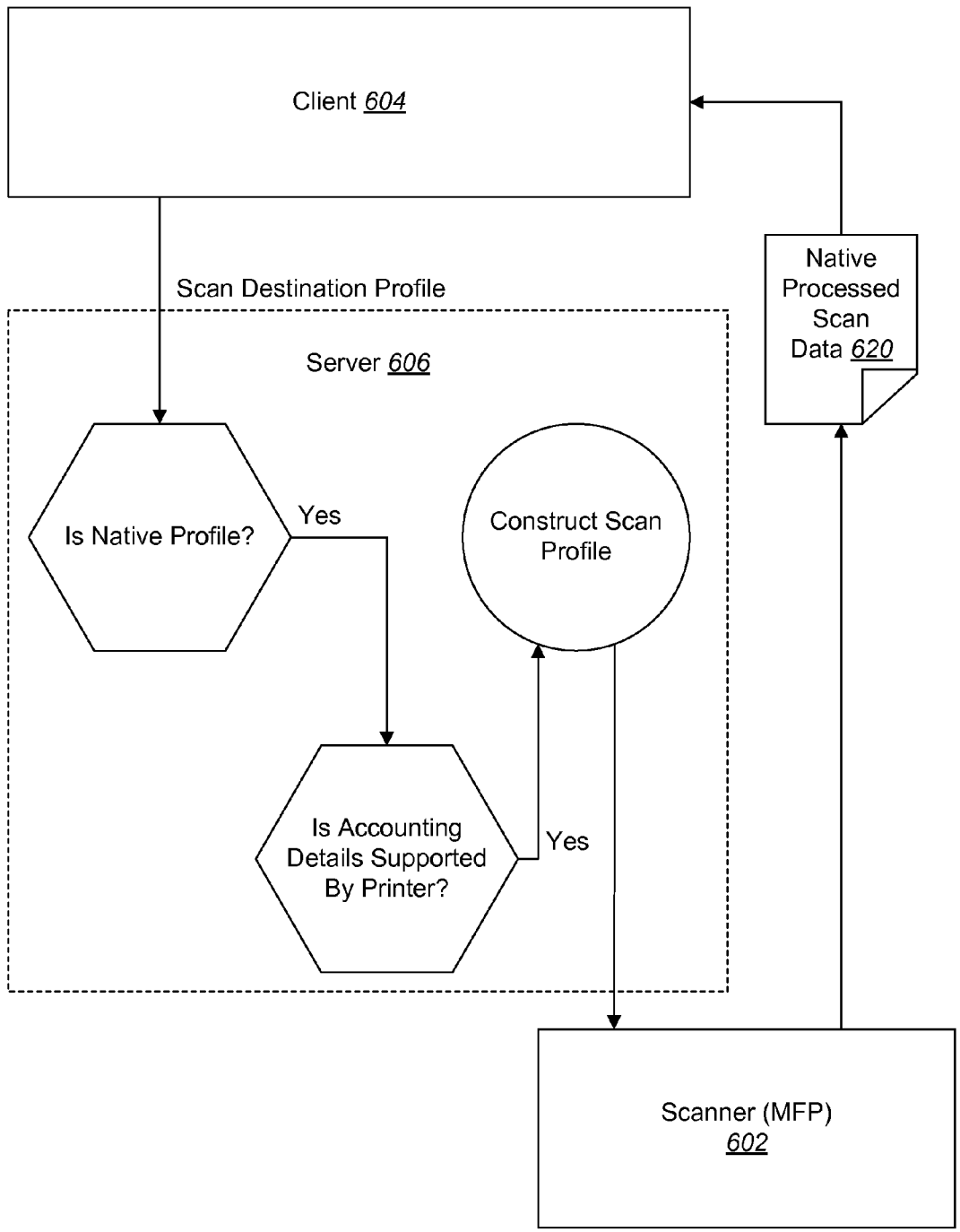
FIG. 6 illustrates a mode of an embodiment in which a scan destination profile and accounting details may be supported by a rendering device.

Referring now to FIG. 6, a rendering device 602, a thin client 604, and a rendering server 606 may be provided in accordance with an embodiment. The rendering device 602 may be a scanner 602, which may be implemented as an MFP 602. The thin client 604 may desire to perform an inbound rendering operation (such as a network scan or inbound fax) from the MFP 602. In one mode, image data 620 exported from the MFP 602 to the thin client 604 may be processed and sent to a destination according to a preprogrammed destination profile.

A destination profile may be loaded on an MFP 602 by making a job request for loading a destination profile to the rendering server 606. In one mode of this embodiment, the rendering server 606 may determine that the output format, device processing, destination mode, and accounting details are native to the MFP 602. In this case, the rendering server 606 may construct a destination profile, according to the job requirements specified in the job request, in a format native to the MFP 602. The rendering server 606 may upload the profile to the MFP 602. When a subsequent scan (or inbound fax) occurs using the destination profile, the scanned image data 620 may be processed on the MFP 602 and sent to the destination according to the destination mode. The MFP 602 may also handle the accounting details natively.

Figure 7A:
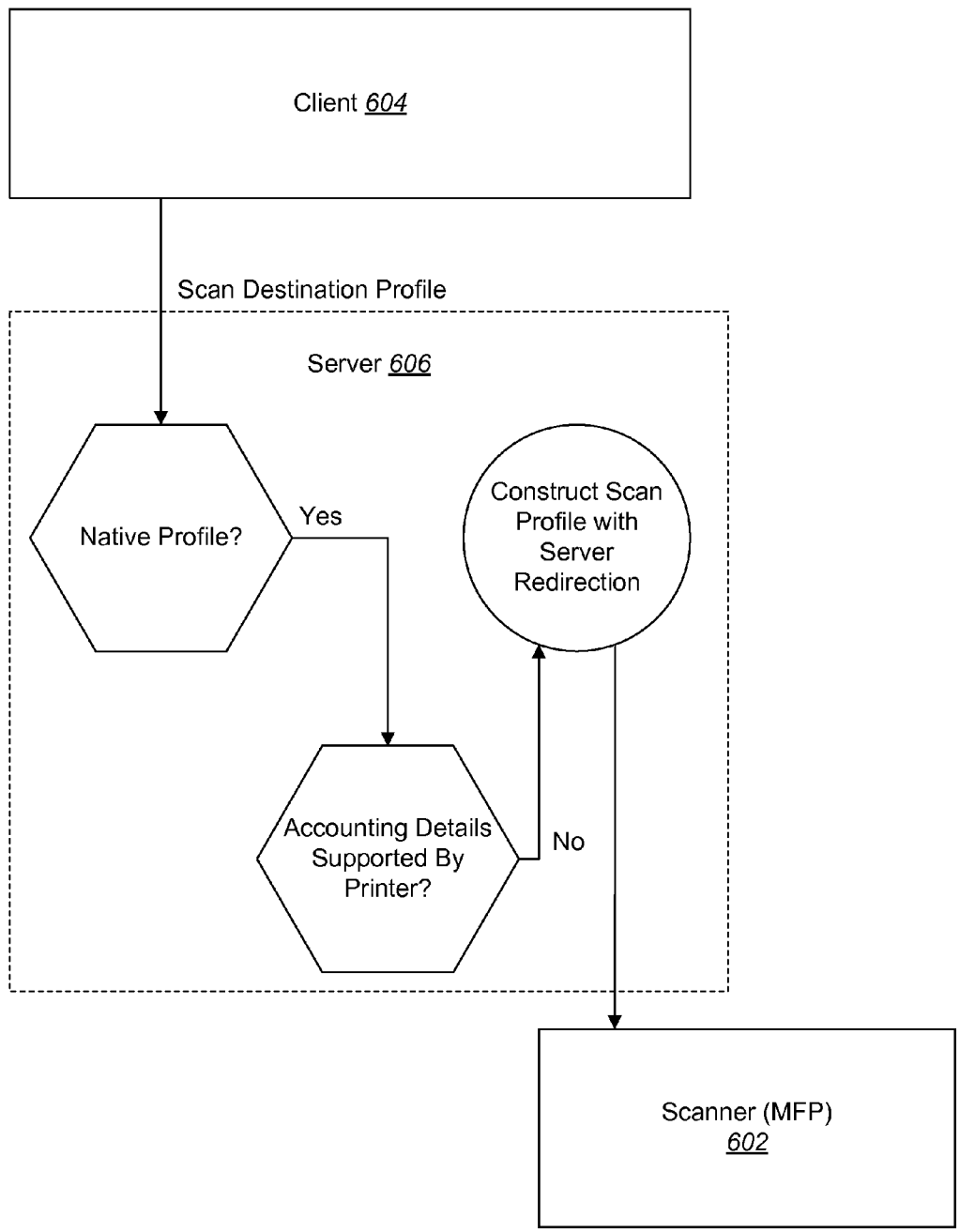
FIGS. 7A and 7B illustrate a mode of the above embodiment in which the scan destination profile may be supported, but accounting details may not be supported by the rendering device.
Figure 7B:
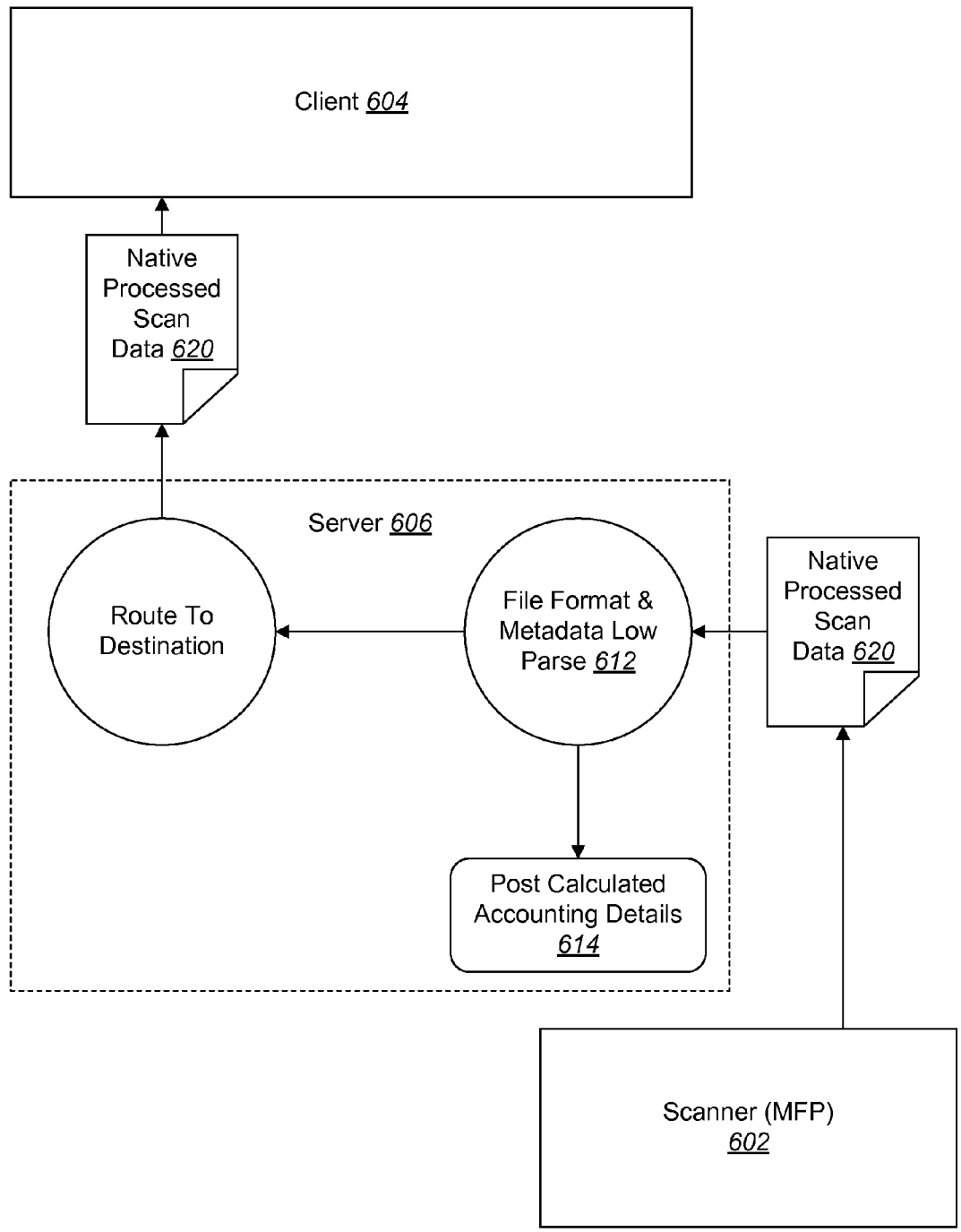

Referring now to FIGS. 7A and 7B, in another mode of the above embodiment, the rendering server 606 may determine, from the job request, that the scan destination profile (e.g., MFP processing, output format, destination mode) is native to the MFP 602, but the level of accounting details are not. In this case, the rendering server 606 may construct a destination profile that is native to the MFP 602, except that the destination and destination delivery method may be set to the rendering server 606.

The rendering server 606 may then construct a second non-native destination profile. This non-native destination profile may specify the remaining processing and destination associated with the above native destination profile. The non-native destination profile may then be stored on the rendering server 606. The non-native destination profile may include the final destination and destination delivery method, and the level of accounting details. When a subsequent scan (or inbound fax) occurs using the destination profile, the scanned image data 620 may be processed on the MFP 602. The processed scanned image data 620 may then be sent to the rendering server 606.

When the rendering server 606 receives the scanned image data 620, the rendering server 606 may determine the accounting details 614 by passing the scanned image data 620 to the job simulator 612. The job simulator 612 may then determine the actual resources consumed, according to the specified level of accounting details. The following are examples of accounting details that might be specified in a scan/fax job: number of images (pages), image size, blank images, color vs. black-and-white, number of color images, number of black-and-white images, amount of black-and-white bit data, amount of color bit data, number of bytes (fax, file), number of files (file), number of recipients (mailboxes, desktops, etc).

The job simulator 612 may determine the accounting details 614 by any manner. The job simulator 612 may use a low parse method to efficiently parse the file data for information, according to the specified accounting details, such as number of pages or images, page/image size, blank pages, color vs. black-and-white, which images have color information, which images do not have color information, coverage, amount of bit data per black-and-white/color page or image, etc. The job simulator 612 may then combine the basic information gathered above with the metadata, if any, which described the job requirements, to determine the actual physical consumption.

Once the accounting details 614 are calculated, the scanned image data 620 may be sent to the final destination, without additional processing, according to the destination(s) specified in the non-native portion of the destination profile. The rendering server 606 may additionally wait for a job reception notification before committing the accounting transaction. The accounting transaction may be performed on the rendering server 606 or exported to an external accounting application.

Figure 8A:
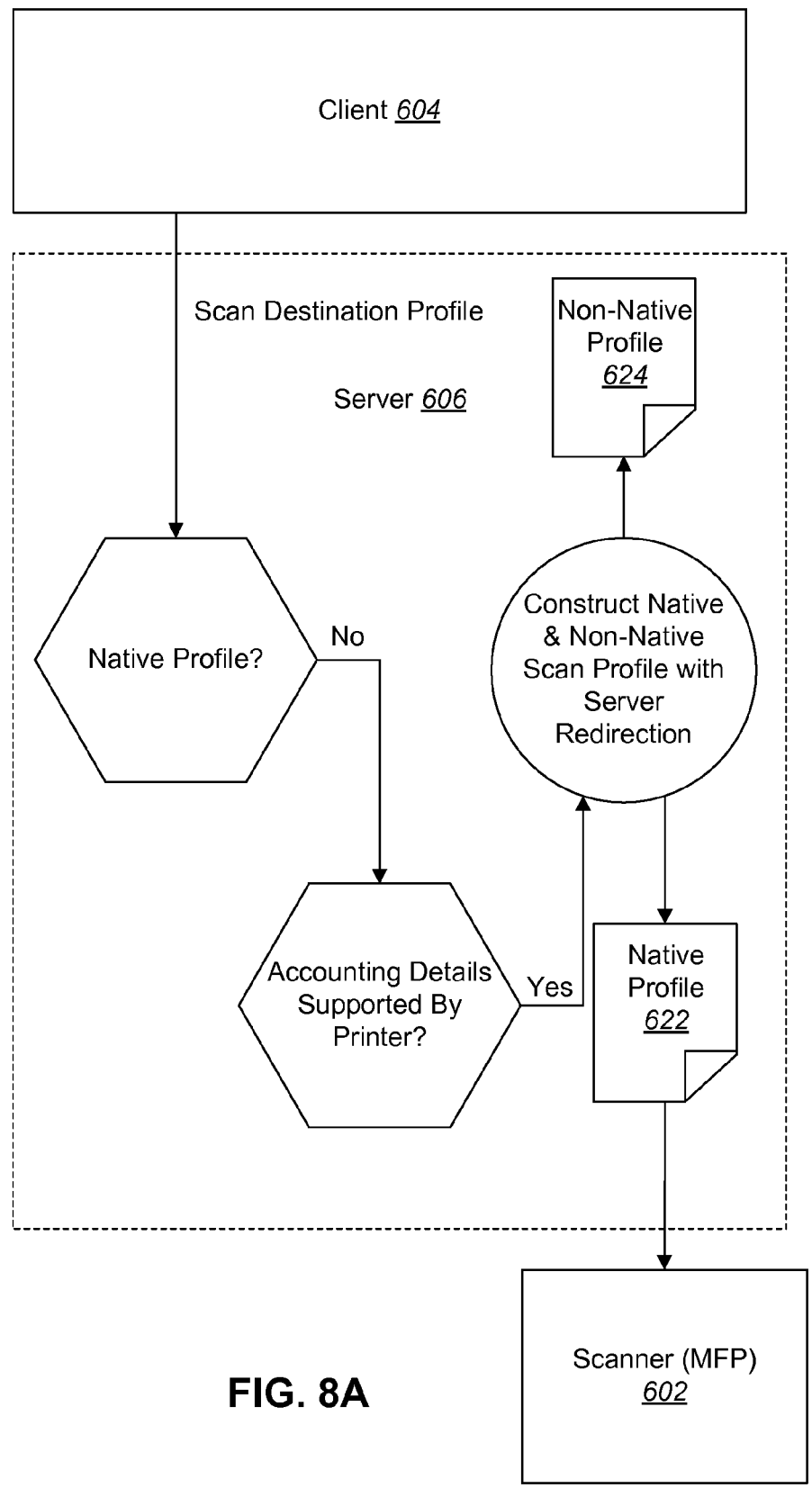
FIGS. 8A and 8B illustrate a mode of the above embodiment in which the scan destination profile may not be supported by the rendering device, but accounting details may be supported by the rendering device.
Figure 8B:
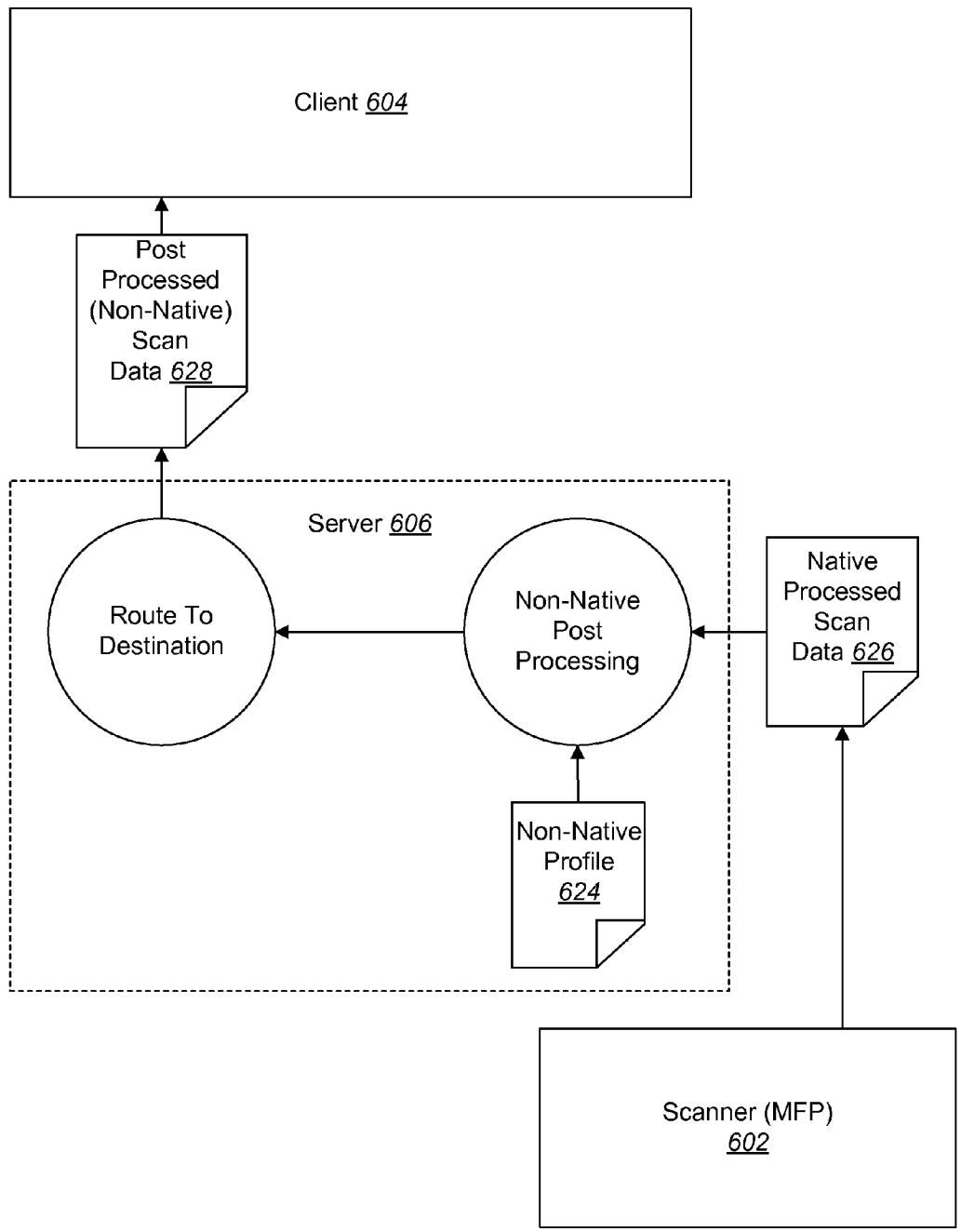

Referring now to FIGS. 8A and 8B, in another mode of the above embodiment, the rendering server 606 may determine, from the job request, that the accounting details are native to the MFP 602, but the scan destination profile is non-native. In this case, the rendering server 606 may construct two destination profiles: an MFP native profile 622 and an MFP non-native profile 624. The MFP native profile 622 may include the processing requirements that are native to the MFP 602. The destination may be set to the server 606. The MFP non-native profile 624 may include the processing requirements that are non-native to the MFP 602. The destination may be set to the final destination. The rendering server 606 may then upload the native profile 622 to the MFP 602, store the non-native profile 624, and associate the non-native profile 624 with the native profile 622.

When a subsequent scan (or inbound fax) occurs using the destination profile, the scanned image data may be processed on the MFP 602 according to the native profile 622. Additionally, the MFP 602 may determine the accounting details. The processed scanned image data 626 may then be sent to the rendering server 606.

Upon receipt, the rendering server 606 may then process the scanned image data 626 according to the non-native profile 624 that is associated with the native profile 622. Examples of host processing may include output formats, image format conversion to document format, OCR handling, encoding (e.g., compression, encryption/decryption, etc.), indexing/filing, document indicia (e.g., watermarks, Bates stamping, page numbering, headers/footers, etc.), cover sheet, destination types and delivery modes, and so forth. The server processed scanned image data 628 may then be sent to the final destination, as specified in the non-native profile 624. In an alternative embodiment, the accounting details may be determined by a job simulator on the rendering server 606, after the scanned data has been processed.

Figure 9A:
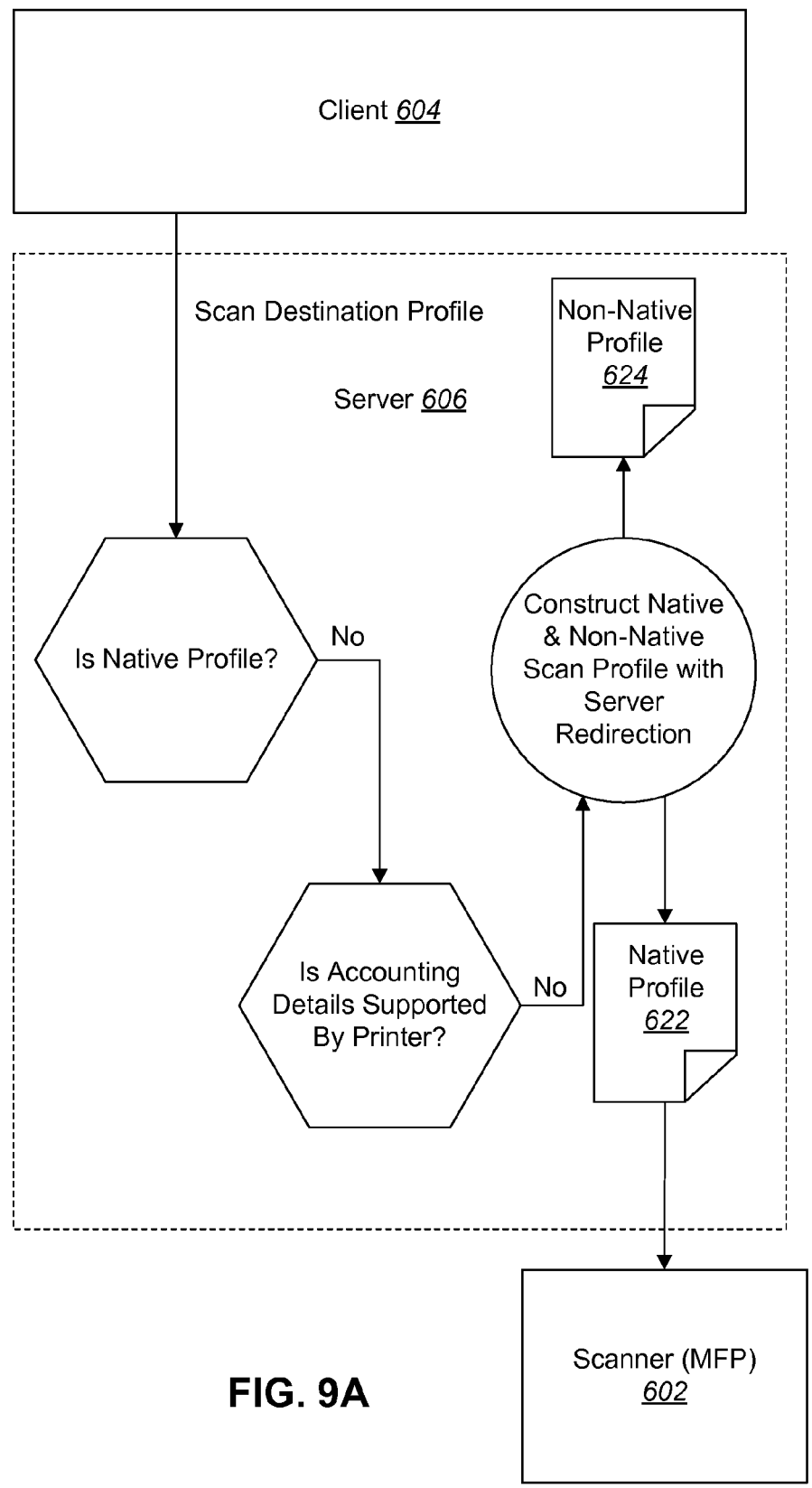
FIGS. 9A and 9B illustrate a mode of the above embodiment in which the scan destination profile may not be supported by the rendering device, and accounting details may not be supported by the rendering device.
Figure 9B:
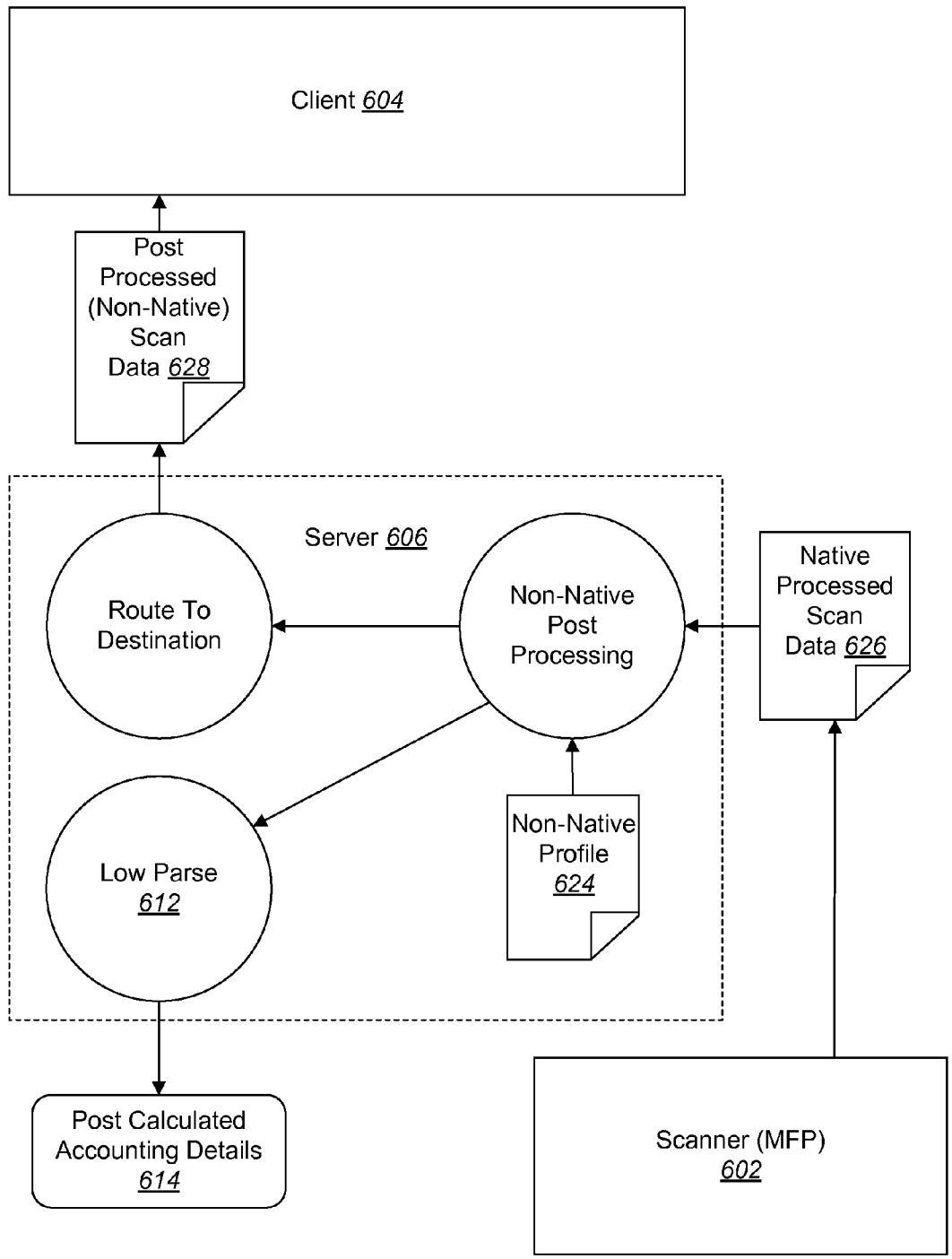

Referring now to FIGS. 9A and 9B, in another mode of the above embodiment, the rendering server 606 may determine, from the job request, that the accounting details and scan destination profile are non-native to the MFP 602. In this case, the rendering server 606 may construct two destination profiles: an MFP native profile 622 and an MFP non-native profile 624. The MFP native profile 622 may include the processing requirements that are native to the MFP 602. The destination may be set to the server 606. The MFP non-native profile 624 may include the processing requirements that are non-native to the MFP 602. The destination may be set to the final destination. The MFP non-native profile 624 may also include the level of accounting details.

The rendering server 606 may upload the native profile 622 to the MFP 602, store the non-native profile 624, and associate the non-native profile 624 with the native profile 622. When a subsequent scan (or inbound fax) occurs using the destination profile, the scanned image data may be processed on the MFP 602 according to the native profile 622. The processed scanned image data 626 may then be sent to the rendering server 606. Upon receipt, the rendering server 606 may then process the scanned image data 626 according to the non-native profile 624 associated with the native profile 622. The server processed scanned image data 628 may then be passed to the job simulator 612 to determine the actual consumption of resources, according to the level of accounting details 614. The server processed scanned image data 628 may then be sent to the final destination, as specified in the non-native profile 624. The rendering server 606 may additionally wait for a final destination reception notification from the client 604 before committing the accounting transaction. The accounting transaction may be performed on the rendering server 606 or exported to an external accounting application.

Figure 10:
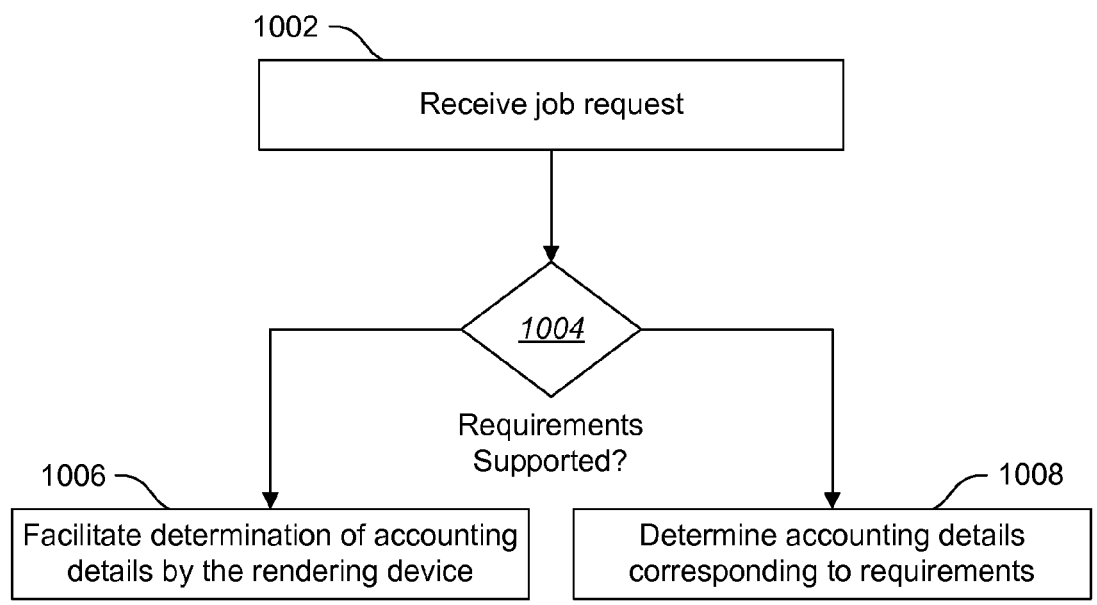
FIG. 10 illustrates a method for detailed job accounting for thin client rendering in accordance with an embodiment.

FIG. 10 illustrates an embodiment of a method 1000 for detailed job accounting for thin client rendering. The method 1000 may be implemented by a rendering server, such as the rendering server 206 discussed above in connection with FIGS. 2-5B or the rendering server 606 discussed above in connection with FIGS. 6-9B.

In accordance with the depicted method 1000, a job request may be received 1002. As discussed above in connection with FIGS. 2-5B, the job request may be an imaging job request from a client 204 for sending an imaging job to a rendering device 202. Alternatively, as discussed above in connection with FIGS. 6-9B, the job request may be a destination profile job request for loading a destination profile on a rendering device 602.

The job request may include one or more accounting detail requirements. The accounting detail requirements may specify accounting details to be determined as part of an imaging job (e.g., number of sheets, color versus black-and-white, etc.). In response to receiving the job request, the rendering server may determine 1004 whether the accounting detail requirements are supported by the rendering device (e.g., whether the rendering device is capable of determining the accounting details specified by the accounting detail requirements).

If the rendering server determines 1004 that accounting detail requirements are supported by the rendering device, then the rendering server may facilitate 1006 determination by the rendering device of accounting details corresponding to the accounting detail requirements. For example, as discussed above in connection with FIG. 2, the rendering server 206 may instruct the client 204 to directly despool a job ticket and file data for the imaging job to the rendering device 202. As another example, as discussed above in connection with FIG. 6, the rendering server 606 may construct a destination profile that specifies the requirements of the destination profile job request (including the accounting detail requirements), and may send the destination profile to the rendering device 602.

If the rendering server determines 1004 that accounting detail requirements are not supported by the rendering device, then the rendering server may itself determine 1008 the accounting details corresponding to the accounting detail requirements. A job simulation may be performed in order to determine the accounting details. For example, as discussed above in connection with FIGS. 3A-3B and FIGS. 5A-5B, the rendering server 206 may instruct the client 204 to send file data for the imaging job to the rendering server 206, and the file data may be provided to a job simulator 212. As another example, as discussed above in connection with FIGS. 7A-7B and 9A-9B, the rendering server 606 may construct a native destination profile that specifies the rendering server 606 as a destination, and may also construct a non-native destination profile that specifies the accounting detail requirements. The native destination profile may be stored on the rendering device 602, and the non-native destination profile may be stored on the rendering server 606. When there is an inbound rendering operation (e.g., a network scan, incoming fax, etc.) image data from the rendering device 602 may be provided to the rendering server 606, and this image data may then be provided to a job simulator 612 for determination of the accounting details.

Figure 11:
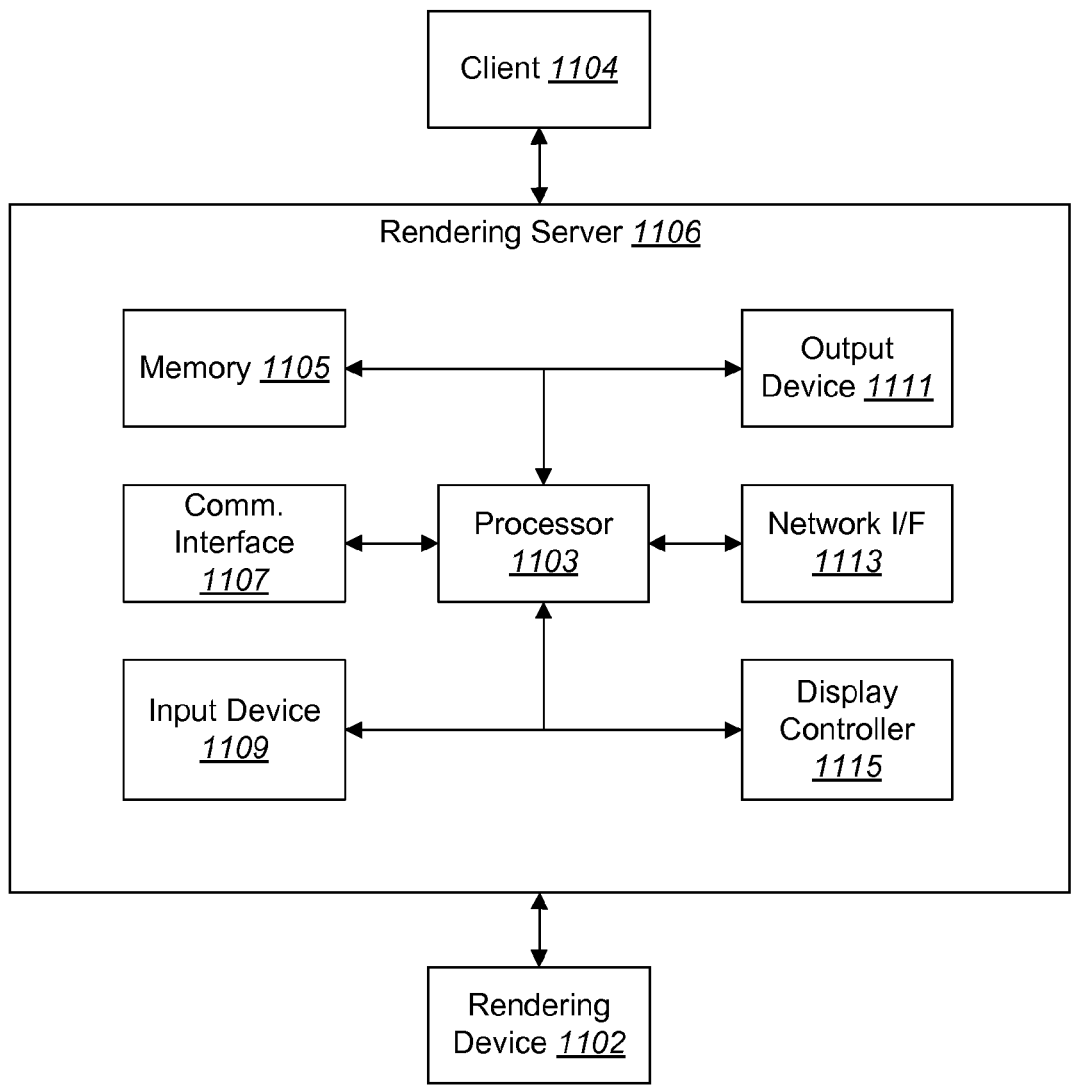
FIG. 11 illustrates various components that may be utilized in a rendering server in accordance with an embodiment.

FIG. 11 illustrates various components that may be utilized in a rendering server 1106. The illustrated components may be located within the same physical structure or in separate housings or structures.

The rendering server 1106 may include a processor 1103 and memory 1105. The processor 1103 may control the operation of the rendering server 1106 and may be embodied as a microprocessor, a microcontroller, a digital signal processor (DSP) or other device known in the art. The processor 1103 typically performs logical and arithmetic operations based on program instructions stored within the memory 1105. The instructions in the memory 1105 may be executable to implement the methods discussed above. For example, the processor 1103 may execute the instructions in the memory 1105 to perform the steps of the method 1000 of FIG. 10, such as receiving 1002 a job request, determining 1004 whether the accounting detail requirements are supported by a rendering device 1102, and so forth.

The rendering server 1106 may also include one or more communication interfaces 1107 and/or network interfaces 1113 for communicating with other electronic devices, such as a rendering device 1102, a client 1104, etc. For example, the rendering server 1106 may receive an imaging job request from the client 1104 via the communication interface 1107 or via the network interface 1113. As another example, the rendering server 1106 may receive image data from a rendering device 1102 via the communication interface 1107 or via the network interface 1113. The communication interface(s) 1107 and the network interface(s) 1113 may be based on wired communication technology, wireless communication technology, or both.

The rendering server 1106 may also include one or more input devices 1109 and one or more output devices 1111. The input devices 1109 and output devices 1111 may facilitate user input. Other components 1115 may also be provided as part of the rendering server 1106.

FIG. 11 illustrates only one possible configuration of a rendering server 1106. Various other architectures and components may be utilized in accordance with the disclosed embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In a rendering server, a method for detailed job accounting for thin client rendering, comprising:
   receiving a job request, wherein:
      the job request comprises at least one accounting detail requirement,
      the at least one accounting detail requirement specifies at least one accounting detail to be determined as part of the job request, and
      an accounting detail tracks information relating to the job request;
   determining whether the at least one accounting detail requirement is supported by a rendering device, wherein the at least one accounting detail requirement is supported by the rendering device if the rendering device is capable of determining the at least one accounting detail specified by the at least one accounting detail requirement;
   if the at least one accounting detail requirement is supported by the rendering device, facilitating determination by the rendering device of the at least one accounting detail corresponding to the at least one accounting detail requirement; and
   if the at least one accounting detail requirement is not supported by the rendering device, determining the at least one accounting detail corresponding to the at least one accounting detail requirement by performing a job simulation, wherein the job simulation determines an amount of resources that will be consumed according to the at least one accounting detail.

2. The method of claim 1, wherein the job request is an imaging job request from a client for sending an imaging job to the rendering device.

3. The method of claim 2, further comprising:
   determining that the rendering device is configured to satisfy all requirements, other than the at least one accounting detail requirement, of the imaging job request; and
   instructing the client to directly despool a job ticket and file data for the imaging job to the rendering device.

4. The method of claim 2, further comprising:
  determining that the rendering device does not support the at least one accounting detail requirement of the imaging job request; and
  instructing the client to send file data for the imaging job to the rendering server.

5. The method of claim 4, wherein performing the job simulation comprises providing the file data to a job simulator.

6. The method of claim 4, further comprising sending the file data to the rendering device when the at least one accounting detail has been determined.

7. The method of claim 2, further comprising:
  determining that at least one file format requirement of the imaging job request is not supported by the rendering device;
  instructing the client to send file data for the imaging job to the rendering server;
  translating the file data into a format that is supported by the rendering device; and
  sending the translated file data to the rendering device.

8. The method of claim 2, further comprising:
  determining that at least one job requirement of the imaging job request is not supported by the rendering device;
  instructing the client to send file data for the imaging job to the rendering server; and
  emulating the at least one job requirement of the imaging job request on the rendering device.

9. The method of claim 1, wherein the job simulation is performed using a low parse method which involves less processing than a full parse method that is performed by the rendering device.

10. The method of claim 1, further comprising waiting for a job completion notification from the rendering device before committing an accounting transaction.

11. The method of claim 1, further comprising exporting the at least one accounting detail determined by performing the job simulation to an accounting system.

12. The method of claim 1, further comprising maintaining the at least one accounting detail determined by performing the job simulation on the rendering server in an internal accounting system.

13. A computer system that is configured to implement a method for detailed job accounting for thin client rendering, the computer system comprising:
  a processor;
  a memory in electronic communication with the processor;
  instructions stored in the memory, the instructions being executable by the processor to:
    receive a job request, wherein:
      the job request comprises at least one accounting detail requirement,
      the at least one accounting detail requirement specifies at least one accounting detail to be determined as part of the job request, and
      an accounting detail tracks information relating to the job request;
    determine whether the at least one accounting detail requirement is supported by a rendering device, wherein the at least one accounting detail requirement is supported by the rendering device if the rendering device is capable of determining the at least one accounting detail specified by the at least one accounting detail requirement;
    if the at least one accounting detail requirement is supported by the rendering device, facilitate determination by the rendering device of the at least one accounting detail corresponding to the at least one accounting detail requirement; and
    if the at least one accounting detail requirement is not supported by the rendering device, determine the at least one accounting detail corresponding to the at least one accounting detail requirement by performing a job simulation, wherein the job simulation determines an amount of resources that will be consumed according to the at least one accounting detail.

14. A non-transitory computer-readable medium comprising executable instructions for implementing a method for detailed job accounting for thin client rendering, the method comprising:
  receiving a job request, wherein:
    the job request comprises at least one accounting detail requirement,
    wherein the at least one accounting detail requirement specifies at least one accounting detail to be determined as part of the job request, and
    an accounting detail tracks information relating to the job request;
  determining whether the at least one accounting detail requirement is supported by a rendering device, wherein the at least one accounting detail requirement is supported by the rendering device if the rendering device is capable of determining the at least one accounting detail specified by the at least one accounting detail requirement;
  if the at least one accounting detail requirement is supported by the rendering device, facilitating determination by the rendering device of the at least one accounting detail corresponding to the at least one accounting detail requirement; and
  if the at least one accounting detail requirement is not supported by the rendering device, determining the at least one accounting detail corresponding to the at least one accounting detail requirement by performing a job simulation, wherein the job simulation determines an amount of resources that will be consumed according to the at least one accounting detail.

* * * * *

UNITED STATES PATENT AND TRADEMARK OFFICE
CERTIFICATE OF CORRECTION

PATENT NO.       : 8,289,536 B2
APPLICATION NO.  : 11/537356
DATED            : October 16, 2012
INVENTOR(S)      : Andrew R. Ferlitsch It is certified that error appears in the above-identified patent and that said Letters Patent is hereby corrected as shown below:

In the Claims

In column 16, line 30, please delete "wherein the at least one" and replace it with --the at least one--.

Signed and Sealed this
Twenty-fourth Day of September, 2013

Teresa Stanek Rea
*Deputy Director of the United States Patent and Trademark Office*